US012643181B2

(12) United States Patent
Lutze et al.

(10) Patent No.: US 12,643,181 B2
(45) Date of Patent: Jun. 2, 2026

(54) UNIVERSALLY USABLE DEVICE FOR PRODUCING A PREDETERMINED BREAKING LINE IN AN EQUIPMENT PART OF A VEHICLE

(71) Applicant: JENOPTIK Automatisierungstechnik GmbH, Jena (DE)

(72) Inventors: Walter Lutze, Jena (DE); Andreas Bode-Mosig, Jena (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 958 days.

(21) Appl. No.: 17/812,642

(22) Filed: Jul. 14, 2022

(65) Prior Publication Data

US 2023/0036158 A1     Feb. 2, 2023

(30) Foreign Application Priority Data

Jul. 30, 2021     (DE) ..................... 10 2021 119 853.4

(51) Int. Cl.
| | |
|---|---|
| *B23K 26/03* | (2006.01) |
| *B23K 26/02* | (2014.01) |
| *B23K 26/082* | (2014.01) |
| *B23K 26/359* | (2014.01) |
| *B23K 26/70* | (2014.01) |
| *B23K 101/00* | (2006.01) |

(52) U.S. Cl.
CPC .......... *B23K 26/705* (2015.10); *B23K 26/082* (2015.10); *B23K 26/359* (2015.10); *B23K 2101/006* (2018.08)

(58) Field of Classification Search
CPC ................................ G01B 11/06; B23K 26/03
See application file for complete search history.

(56) References Cited

U.S. PATENT DOCUMENTS

| | | | | |
|---|---|---|---|---|
| 4,737,628 | A | * | 4/1988 | Lovoi ................... B08B 7/0042 |
| | | | | 606/7 |
| 5,483,057 | A | | 1/1996 | Gross et al. |
| 5,744,776 | A | * | 4/1998 | Bauer .................. B23K 26/123 |
| | | | | 219/121.7 |
| 5,754,294 | A | * | 5/1998 | Jones ..................... G01B 11/06 |
| | | | | 356/432 |

(Continued)

FOREIGN PATENT DOCUMENTS

| | | | |
|---|---|---|---|
| DE | 43 22 865 A1 | 1/1995 | |
| DE | 101 24 943 A1 | 12/2002 | |

(Continued)

*Primary Examiner* — Ibrahime A Abraham
*Assistant Examiner* — Lawrence H Samuels
(74) *Attorney, Agent, or Firm* — Christensen, Fonder, Dardi & Busse PLLC; John P. Fonder

(57) ABSTRACT

A universally usable device for producing a predetermined breaking line in an equipment part of a vehicle. The device includes a laser beam generator, a laser scanner and a linear or matrix-shaped first sensor arrangement with first individual sensors of an identical first sensitivity and at least one identical linear or matrix-shaped second sensor arrangement of second individual sensor, which is arranged with an offset to the first sensor arrangement of first individual sensors, and the second individual sensors have an identical second sensitivity which differs from the first sensitivity.

5 Claims, 4 Drawing Sheets

(56) References Cited

U.S. PATENT DOCUMENTS

| | | | | |
|---|---|---|---|---|
| 5,883,356 A * | 3/1999 | Bauer | ............... | B23K 26/0344 219/121.85 |
| 6,399,915 B1 * | 6/2002 | Mori | ..................... | B23K 26/03 219/121.83 |
| 6,710,283 B2 * | 3/2004 | Mori | ................... | B23K 31/125 219/121.64 |
| 6,737,607 B2 * | 5/2004 | Nicholas | .............. | B29C 59/007 219/121.7 |
| 6,791,057 B1 * | 9/2004 | Kratzsch | ............... | B23K 26/24 219/121.62 |
| 6,863,860 B1 * | 3/2005 | Birckbichler | .......... | G01B 11/08 425/141 |
| 7,297,897 B2 * | 11/2007 | Nicholas | ............... | B23K 26/40 219/121.7 |
| 9,089,926 B2 * | 7/2015 | Pfitzner | ............... | B23K 26/032 |
| 10,960,494 B2 * | 3/2021 | Lutze | ................. | B23K 26/082 |
| 11,192,203 B2 | 12/2021 | Wittenbecher et al. | | |
| 2003/0019848 A1 * | 1/2003 | Nicholas | ........... | B23K 26/0342 219/121.76 |
| 2004/0124227 A1 * | 7/2004 | Seki | .................... | B23K 31/125 228/103 |
| 2008/0290075 A1 * | 11/2008 | Wittenbecher | ......... | B23K 26/38 425/141 |
| 2010/0134628 A1 * | 6/2010 | Pfitzner | ................. | B23K 26/03 219/121.85 |
| 2018/0133841 A1 * | 5/2018 | Lutze | ................. | B23K 26/082 |
| 2018/0361515 A1 * | 12/2018 | Kagiya | ................. | B23K 26/00 |
| 2019/0255614 A1 * | 8/2019 | Madigan | ........... | B23K 26/0626 |

FOREIGN PATENT DOCUMENTS

| | | | |
|---|---|---|---|
| DE | 10 2012 209 083 A1 | 12/2013 |
| DE | 10 2018 116 998 A1 | 1/2020 |
| EP | 3 321 024 A1 | 5/2018 |

* cited by examiner

UNIVERSALLY USABLE DEVICE FOR PRODUCING A PREDETERMINED BREAKING LINE IN AN EQUIPMENT PART OF A VEHICLE

PRIORITY CLAIM

The present application claims priority to German Patent Application No. 10 2021 119 853.4, filed on Jul. 30, 2021, which said application is incorporated by reference in its entirety herein.

FIELD OF THE INVENTION

The invention relates to a device using which material is removed down to a predetermined residual wall thickness along a predetermined breaking line by a processing laser beam scanning an equipment part of a vehicle.

BACKGROUND OF THE INVENTION

The production of predetermined breaking lines in vehicle equipment parts, e.g. for airbag openings in the dashboard, in the door trim or in the steering wheel hub or as breaking points on components protruding into the passenger compartment, such as cup holders, for example, by means of lasers has long been known. Due to the high requirements, on the one hand, for them to break open reliably if necessary and, on the other hand, for an aesthetic appearance of the equipment parts, so that a vehicle occupant should not perceive the predetermined breaking openings with the naked eye, the material removal along the predetermined breaking lines outlining the predetermined breaking openings is sensor-controlled when producing them. It is also known for other applications, e.g. in the packaging industry, to introduce predetermined breaking lines as separating aids in containers and the like. In order to create a predetermined breaking line by laser material removal, slots or holes which do not extend completely through the workpiece, or micro-holes which penetrate the workpiece only with a very small hole, are introduced into the respective workpiece. Sensor monitoring can be used here to produce either a reproducible, remaining defined residual wall thickness or micro-holes, which are not visible to an unaided eye, along the predetermined breaking line by using the exceeding of a predefined threshold value as a control variable upon detection of radiation energy transmitted through the residual wall or the microhole. For this purpose, at least one individual sensor is arranged on a side of the workpiece opposite the laser (visible side), which sensor detects, during processing, a transmitted part of the processing laser beam if the workpiece only has a specific residual wall thickness or microhole (hereinafter only referred to as residual wall thickness) within the predetermined breaking line at the respective processing location. The relative movement required for generating predetermined breaking lines by means of energy radiation can be generated both by the laser beam as a tool and by the workpiece, in this case the equipment part. When the laser beam moves, either an individual sensor is moved along synchronously or there is an arrangement of individual sensors along the predetermined breaking line, so that every possible processing location along the predetermined breaking line is in the field of view of at least one individual sensor.

In the case of an individual sensor moved along synchronously, an equal signal formed by it is a measure of an equal residual wall thickness.

In the case of an arrangement of individual sensors, these are matched to each other in their sensitivity, so that in the case of the same transmitted radiation, the individual signals formed by the received individual sensors produce an identical resulting signal, which is a measure of an identical residual wall thickness. In this context, sensitivity is understood to be the dynamic range and the resolution within the dynamic range as well as the spectral range and the spectral resolution of the respective individual sensor. Individual sensors have different sensitivity, in particular if they provide signals in a different spectral range and/or a different dynamic range.

Whether the predetermined breaking line is created by holes that are round in the broadest sense or by extended slots, with shorter or longer webs remaining between them and with a greater or smaller, even zero, residual wall thickness, is designed as a function of the material properties of the equipment part in such a way that a predetermined breaking line is created that can be opened with a predetermined, defined tearing force. Depending on the choice of material, this may apply to a wide range of residual wall thicknesses.

For the purpose of this description, transmitted radiation shall be understood as the processing laser radiation transmitted through the material at the processing location and radiation generated at the processing location by interaction of the processing laser radiation with the material. An identical transmitted radiation is a radiation with identical spectral components and identical intensity.

Devices known from the prior art differ in the configuration of the sensors, in that either an individual sensor, a linear arrangement of individual sensors or a matrix of individual sensors are present. The sensitivity, which is the same for all individual sensors, is specified with the design of the device depending on the material properties of the equipment part. Adapting an existing device to an expected incident transmitted radiation is done, if necessary, by electronically changing the sensitivity of the individual sensors or by connecting filters ahead of them.

As already explained, sensitivity in the sense of this application shall be understood to cover both the dynamic range and the resolution within the dynamic range as well as the spectral range and the spectral resolution of the respective individual sensor. Individual sensors have different sensitivity, in particular if they provide signals in a different spectral range and/or a different dynamic range.

SUMMARY OF THE INVENTION

It is the object of the invention to provide a device that can be used flexibly for a wide range of materials for equipment parts of a vehicle without requiring individual adaptation.

With regard to a device for producing a predetermined breaking line in an equipment part of a vehicle, said device comprising a laser beam generator, a laser scanner and a linear or matrix-shaped first sensor arrangement with first individual sensors of an identical first sensitivity and an identical aperture angle, wherein the first sensor arrangement is arranged within a scanning range of the laser scanner, and directly adjacent first individual sensors are the same distance apart from one another and have overlapping fields of view, the object is achieved in that at least one identical linear or matrix-shaped second sensor arrangement of second individual sensors is present, which is arranged with an offset to the first sensor arrangement within the scanning range of the laser scanner, and the second individual sensors have an identical second sensitivity which differs from the first sensitivity.

Advantageously, the first individual sensors and the second individual sensors have fields of view overlapping in pairs.

An advantageous option for the different sensitivity of the first individual sensors and of the second individual sensors concerns different dynamic ranges.

Alternatively or in addition, the different sensitivity of the first individual sensors and of the second individual sensors concerns different spectral ranges or/and different resolutions.

Preferably, exactly one first and one second sensor arrangement or one first, one second and one third sensor arrangement are present.

BRIEF DESCRIPTION OF THE DRAWINGS

The invention will be explained in more detail below with reference to exemplary embodiments and drawings. In the drawings.

DETAILED DESCRIPTION

Figure 1:
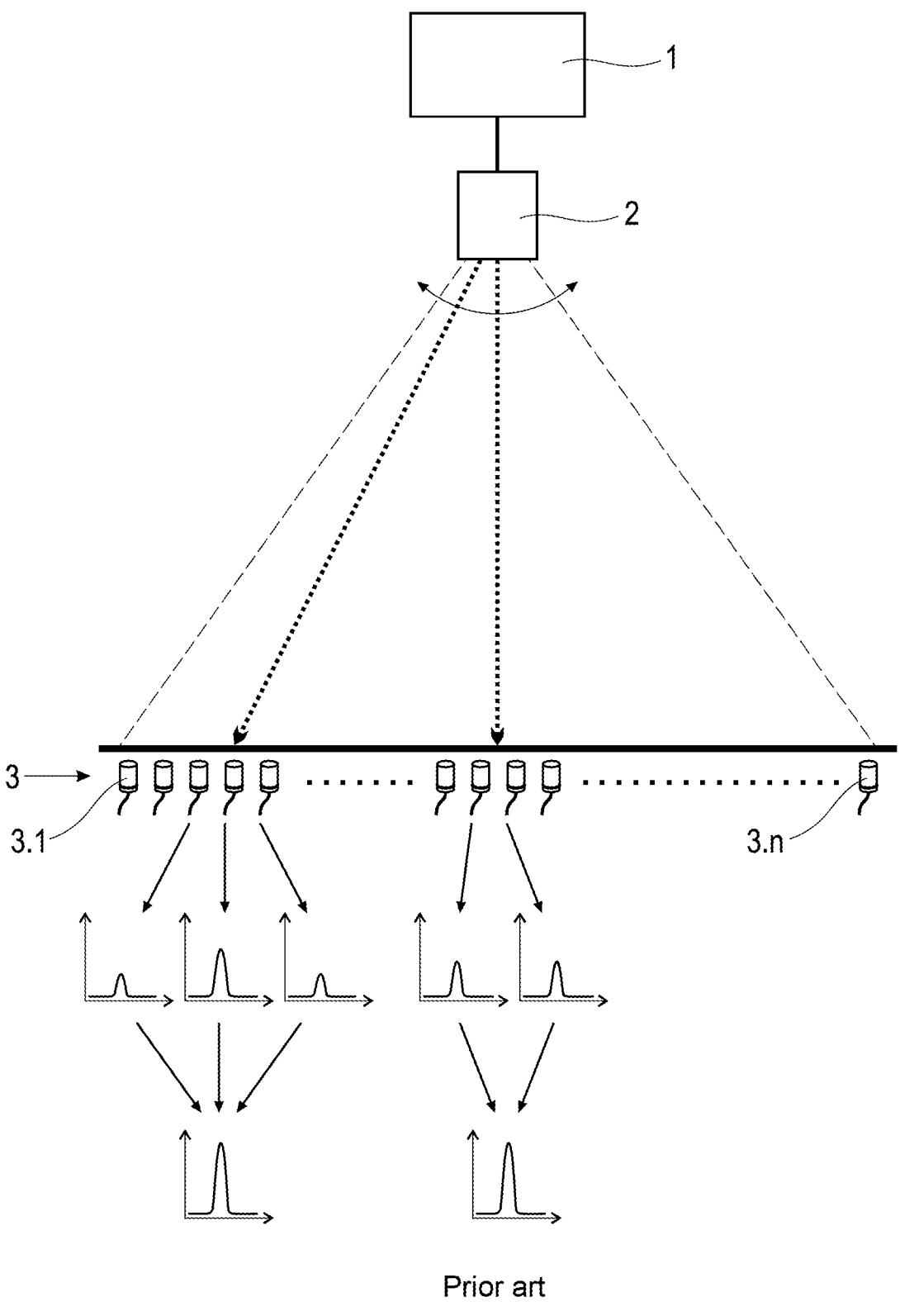
FIG. 1 shows a schematic representation of a prior art device with a first sensor arrangement and the generated signals at two different processing locations.
Figure 2:
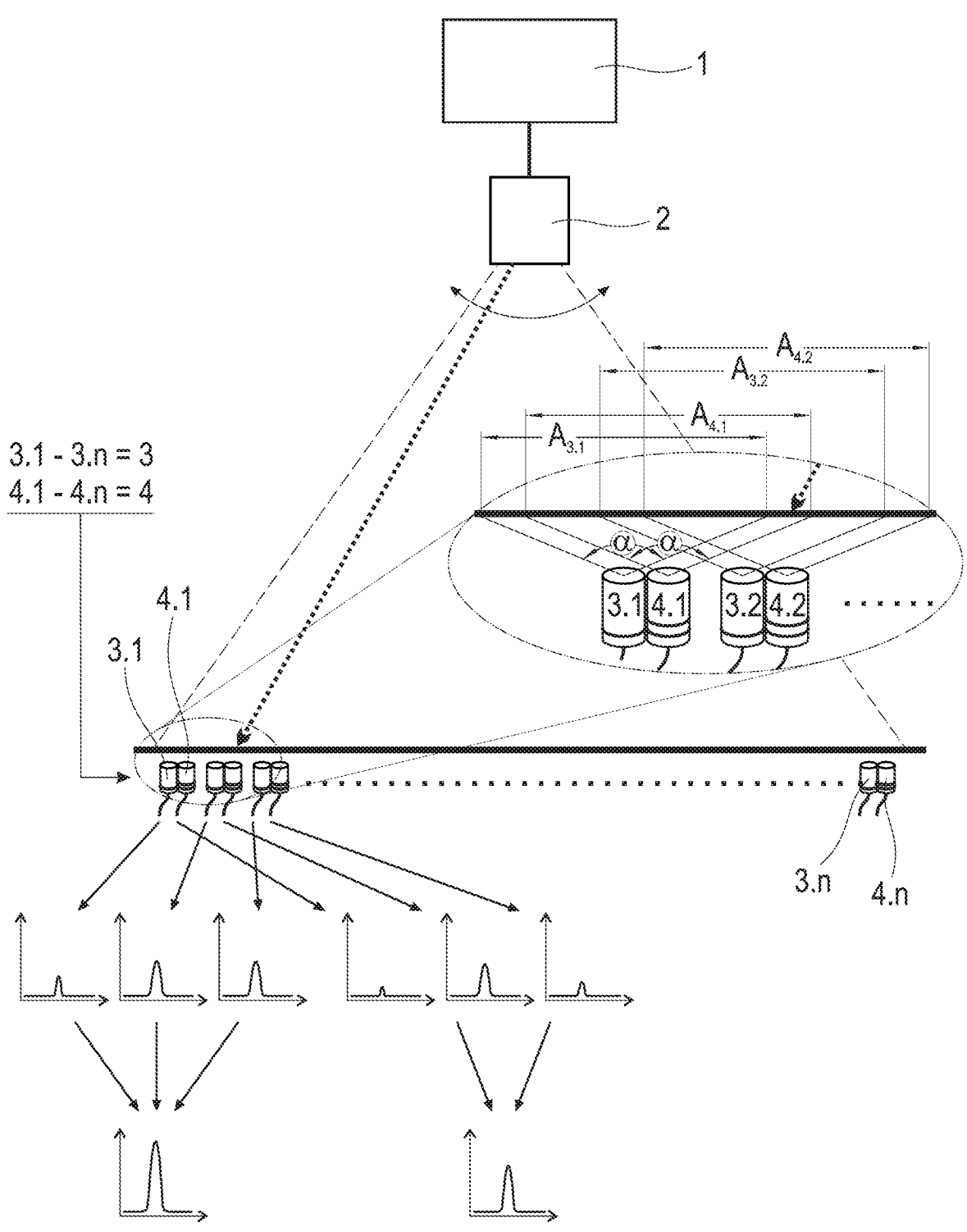
FIG. 2 shows a schematic representation of a device according to the invention with a first and a second sensor arrangement and the generated signals at two different processing locations.

FIG. 2 schematically illustrates an embodiment example of a device according to the invention for producing a predetermined breaking line in an equipment part of a vehicle. Like a prior art device known in practice, it contains, as shown schematically in FIG. 1, a laser generator 1, a laser scanner 2 and a first sensor arrangement 3 with a plurality of first individual sensors 3.1-3.$n$. The first sensor arrangement 3 can be linear or matrix-shaped.

A linear configuration of the first sensor arrangement 3 requires fewer first individual sensors 3.1-3.$n$, but is bound to a special line layout and position of the predetermined breaking line within an add-on part.

In contrast thereto, a matrix-shaped configuration of the first sensor arrangement 3 requires a multiple of first individual sensors 3.1-3.$n$ compared to a linear configuration, but can be used flexibly to produce predetermined breaking lines in different positions on the equipment part or different line layouts.

So that an identical resulting signal is formed for an identical residual wall thickness at each processing location along the predetermined breaking line caused by the transmitted radiation, the first individual sensors 3.1-3.$n$, irrespective of whether the first sensor arrangement 3 is of linear or matrix configuration, are arranged at an equal distance from the respective directly adjacent first individual sensors 3.1-3.$n$, have an equal aperture angle $\alpha$ and exhibit an equal sensitivity.

The aperture angle $\alpha$ is sufficiently large to allow transmitted radiation from several first individual sensors 3.1-3.$n$ to be detected at each processing location. The individual signals formed by the detecting first individual sensors 3.1-3.$n$ yield a resulting signal, which is a measure of the intensity of the transmitted radiation at the processing location. Based on this, the residual wall thickness at the processing location can be derived in knowledge of the transmission properties of the material of the add-on part or on the basis of previously determined comparison values to which a residual wall thickness is assigned.

The first sensor arrangement 3 is arranged within a scanning area of the laser scanner 2, so that a processing laser beam emitted by the laser generator is assigned to several first individual sensors 3.1-3.$n$ in each scanning position, i.e. transmitted radiation coming from a processing location is detected by several first individual sensors 3.1-3.$n$. In this respect, a device according to the invention does not differ from a device according to the prior art.

It is essential to the invention that at least one linear or matrix-shaped second sensor arrangement 4 of the same type as the first sensor arrangement 3 is present and is arranged with an offset thereto, and the second sensor arrangement 4 comprises second individual sensors 4.1-4.$n$ which have an identical second sensitivity among one another, which differs from the first sensitivity of the first individual sensors 3.1-3.$n$.

Advantageously, a first individual sensor 3.1-3.$n$ and a second individual sensor 4.1-4.$n$ form a sensor pair whose fields of view $A_{3.1-4.n}$ overlap almost completely.

In practice, the sensor pairs cannot have completely overlapping fields of view $A_{3.1-4.n}$, because they cannot be located in the same place. Since the first individual sensors 3.1-3.$n$ and the second individual sensors 4.1-4.$n$ not only have the same aperture angle $\alpha$, but also a large aperture angle $\alpha$, and are arranged in pairs as close as possible to one another, the fields of view $A_{3.1-4.n}$ of the first and second individual sensors 3.1-3.$n$, 4.1-4.$n$, forming respective pairs, overlap to such an extent that they can be regarded as coinciding and thus as completely overlapping fields of view $A_{3.1-4.n}$.

Figure 3:
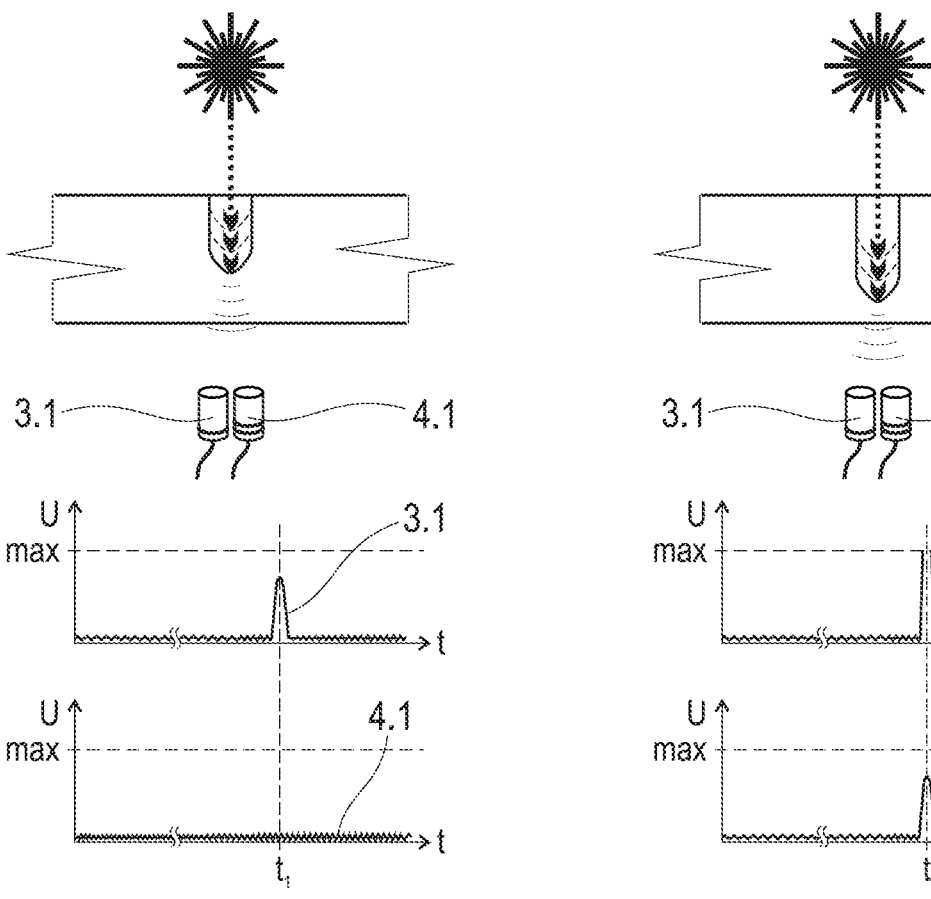
FIG. 3 shows a schematic representation of processing at a processing location with a device according to FIG. 2 at two points in time and signals generated by a pair of sensors at the points in time.

FIG. 3 shows processing at the same processing location at different times t1, t2. The difference in sensitivity here is at least mainly due to the different dynamic ranges of the first and second individual sensors 3.1-3.$n$, 4.1-4.$n$. If the intensity of the transmitted radiation is low, after only a few scanning passes, only the first individual sensors 3.1-3.$n$, of which only one is shown here, respond at a first time t1. On the other hand, if the intensity of the transmitted radiation is higher, after more scanning passes, the first individual sensors 3.1-3.$n$ are overloaded (and the second individual sensors 4.1-4.$n$, of which only one is also shown, provide signals which are correlated to the intensity of the transmitted radiation) at a second time t2.

The dynamic ranges of the first individual sensors 3.1-3.$n$ and the second individual sensors 4.1-4.$n$ as well as their overlap can advantageously also be selected in such a way that a respective resulting signal, which is a measure for reaching the specified residual wall thickness, is formed by the first individual sensors 3.1-3.$n$ and the second individual sensors 4.1-4.$n$. Advantageously, the resolution can also differ within the different dynamic ranges, with the second individual sensors 4.1-4.$n$, which are less sensitive than the first individual sensors 3.1-3.$n$, having the higher resolution.

In total, a larger dynamic range is thus available for the production of predetermined breaking lines. The sensitivity indicated in the drawing is merely an example.

The larger resulting dynamic range can also be used for ablation to a different residual wall thickness at different locations along the predetermined breaking line. Or ablation can take place in different processing regimes, if the first individual sensors 3.1-3.$n$ or the second individual sensors 4.1-4.$n$ detect.

Due to the two sensor arrangements 3,4, the device can further be used, for example, for processing different equipment parts which have a very different transmission behavior for the processing laser radiation, or, for example, the processing regime can be changed after detection of a low intensity of the transmitted radiation detected by the first individual sensors 3.1-3.$n$, while processing is terminated at a comparatively high intensity of the transmitted radiation detected by the second individual sensors 4.1-4.$n$. It is also possible to process equipment parts which are identical per se and where different batches differ greatly in their transmission behavior, e.g. differently colored leather, since the summation of the two dynamic ranges provides a larger resulting dynamic range.

Alternatively, the first and second individual sensors 3.1-3.$n$, 4.1-4.$n$ may be selected to differ in spectral range. In this case, the first individual sensors 3.1-3.$n$ are more sensitive to the spectrum of the processing laser radiation and the second individual sensors 4.1-4.$n$ are more sensitive to the spectrum of the radiation produced at the processing location by interaction of the processing laser radiation with the material, or vice versa.

The first and second sensitivities may also differ in a combination of different dynamic range and different spectral range.

Figure 4:
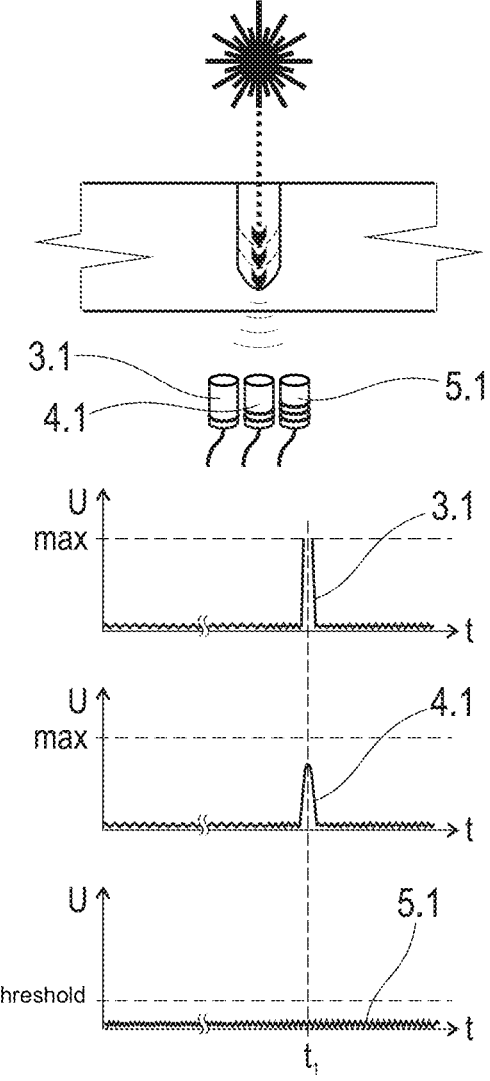
FIG. 4 shows a schematic representation of processing at a processing location with a device comprising a first, a second, and a third sensor arrangement, at two points in time, and the signals generated by a sensor triplet at the points in time.
Figure 4:
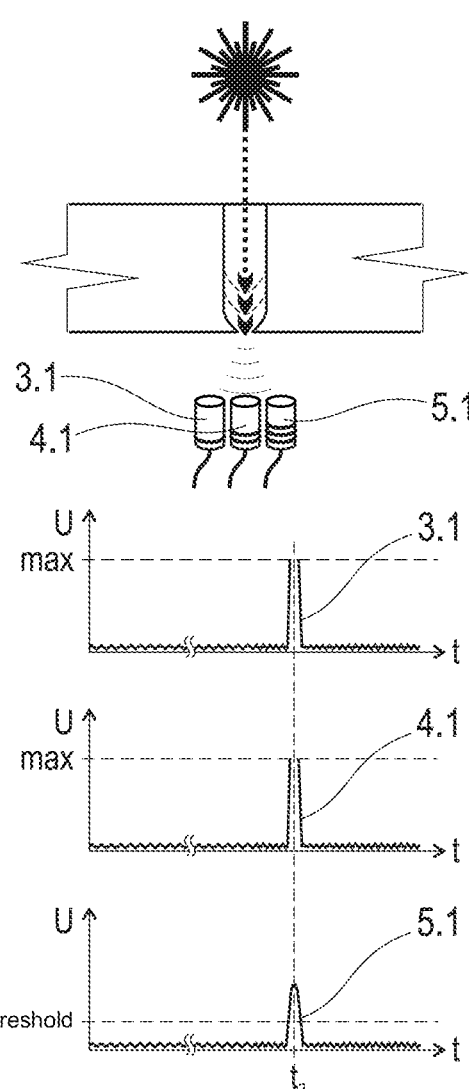

In FIG. 4, the signals of a first, second and third individual sensor 3.1, 4.1, 5.1 at two times t1, t2 are shown for a further embodiment example. In this embodiment example, the device additionally has a third sensor arrangement 5 with third individual sensors 5.1-5.$n$. Shown here are one individual sensor from each of the sensor arrangements, which, analogous to the previous embodiment example with sensor pairs, form sensor triplets here.

Advantageously, the third sensitivity of each third individual sensor 5.1-5.$n$ of a respective sensor triplet is determined in such a way that a resulting signal formed from the signals of the third individual sensors 5.1-5.$n$ when a safety threshold is reached forms a measure indicating that the residual wall thickness has not been reached and thus represents an error message. That is, while a certain resulting signal formed by the signals of the second individual sensors 3.1-3.$n$ represents a measure for reaching a certain residual wall thickness, already a first resulting signal formed from the signals of the third individual sensors 5.1-5.$n$ means that the predetermined breaking line no longer meets the requirements.

Furthermore, the options described above for a device with only first individual sensors 3.1-3.$n$ and second individual sensors 4.1-4.$n$ are also transferable to a device with additional third individual sensors 5.1-5.$n$.

Since the device has several identical sensor arrangements, each of which alone detects radiation transmitted at a processing location along the predetermined breaking line by means of several individual sensors, and the individual sensors of the different sensor arrangements have a different sensitivity, the sensitivity range, which lies in a broader spectral spectrum and/or a broader dynamic range, is increased compared to a device according to the prior art.

LIST OF REFERENCE NUMERALS 1 laser beam generator
2 laser scanner
3 first sensor arrangement
3.1-3.$n$ first individual sensors
4 second sensor arrangement
4.1-4.$n$ second individual sensors
5 third sensor arrangement
5.1-5.$n$ third individual sensors
$\alpha$ aperture angle
$A_{3.1-4.n}$ field of view
$t_1$ first point in time
$t_2$ second point in time

What is claimed is:

1. A universally usable device for producing a predetermined breaking line in an equipment part of a vehicle, comprising:
   a laser beam generator,
   a laser scanner,
   a linear or matrix-shaped first sensor arrangement with first individual sensors of an identical first sensitivity and an identical aperture angle, wherein the first sensor arrangement is arranged within a scanning range of the laser scanner, and directly adjacent first individual sensors, are a same distance apart from one another, and have overlapping fields of view, and
   at least one identical linear or matrix-shaped second sensor arrangement of second individual sensors, which is arranged with an offset to the first sensor arrangement within the scanning range of the laser scanner, and the second individual sensors have an identical second sensitivity which differs from the first sensitivity, wherein the different sensitivity of the first individual sensors and of the second individual sensors concerns different dynamic ranges, resulting in a larger dynamic range in total for producing the predetermined breaking line.

2. The universally usable device for producing a predetermined breaking line in an equipment part of a vehicle according to claim 1, wherein the first individual sensors and the second individual sensors have fields of view overlapping in pairs.

3. The universally usable device for producing a predetermined breaking line in an equipment part of a vehicle according to claim 1, wherein the different sensitivity also concerns different resolutions.

4. The universally usable device for producing a predetermined breaking line in an equipment part of a vehicle according to claim 2, wherein exactly one first and one second sensor arrangement are present.

5. The universally usable device for producing a predetermined breaking line in an equipment part of a vehicle according to claim 2, wherein one first, one second and one third sensor arrangement are present.

* * * * *